United States Patent
Lin et al.

(10) Patent No.: US 6,699,384 B1
(45) Date of Patent: Mar. 2, 2004

(54) COMPACT ELECTROCHEMICAL SENSOR SYSTEM AND METHOD FOR FIELD TESTING FOR METALS IN SALIVA OR OTHER FLUIDS

(75) Inventors: Yuehe Lin, Richland, WA (US); Wendy D. Bennett, Kennewick, WA (US); Charles Timchalk, Kennewick, WA (US); Karla D. Thrall, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 171 days.

(21) Appl. No.: 09/667,034

(22) Filed: Sep. 20, 2000

Related U.S. Application Data

(63) Continuation-in-part of application No. 09/399,821, filed on Sep. 21, 1999, now Pat. No. 6,494,614.

(51) Int. Cl.$^7$ .................... G01N 27/327; G01N 27/28
(52) U.S. Cl. .................... 205/792; 205/775; 205/789; 204/409
(58) Field of Search ................ 204/409, 603; 205/775, 789, 781.5, 792

(56) References Cited

U.S. PATENT DOCUMENTS 5,780,720 A * 7/1998 Swain ........................... 73/38
6,398,930 B2 * 6/2002 Fukunaga et al. .......... 204/409

OTHER PUBLICATIONS

M Pravda et al.,"Application of Stripping Voltammetry to Trace Lead Analysis in Intermediates And Final Products of Syntheses of Pharmaceuticals", 1 pg. 1996. Abstract J. Pharm Biomed Anal May 1996 14(7):756–71.

BJ Feldman et al., "Electrochemical Determination of Low Blood Lead Concentrations With a Disposable Carbon Microarray Electrode", 1 pg. 1995. Abstract Clin. Chem, Apr. 1995; 41(4):557–63.

SW Lee et al., "Direct Methods For The Determination of Lead in Whole Blood By Anodic Stripping Voltammetry", 1 pg. 1980. Am J Med Technol. Dec. 1980, 46(12):853–7 Abstract.

(List continued on next page.)

*Primary Examiner*—Nam Nguyen
*Assistant Examiner*—Alex Noguerola
(74) *Attorney, Agent, or Firm*—Stephen R. May; Frank S. Rosenberg

(57) ABSTRACT

Microanalytical systems based on a microfluidics/electrochemical detection scheme are described. Individual modules, such as microfabricated piezoelectrically actuated pumps and a microelectrochemical cell were integrated onto portable platforms. This allowed rapid change-out and repair of individual components by incorporating "plug and play" concepts now standard in PC's. Different integration schemes were used for construction of the microanalytical systems based on microfluidics/electrochemical detection. In one scheme, all individual modules were integrated in the surface of the standard microfluidic platform based on a plug-and-play design. Microelectrochemical flow cell which integrated three electrodes based on a wall-jet design was fabricated on polymer substrate. The microelectrochemical flow cell was then plugged directly into the microfluidic platform. Another integration scheme was based on a multilayer lamination method utilizing stacking modules with different functionality to achieve a compact microanalytical device. Application of the microanalytical system for detection of lead in, for example, river water and saliva samples using stripping voltammetry is described.

25 Claims, 10 Drawing Sheets

OTHER PUBLICATIONS

RJ Gajan et al., "Determination of Lead and Cadmium in Foods by Anodic Stripping Voltammetry: I. Development of Method", 1 pg. 1982. Abstract J. Assoc Off. Anal Chem. Jul. 1982; 65(4):970–7.

RD Satzger et al., "Determination of Lead in Bonemeal By Differential Pulse Anodic Stripping Voltammetry Using a Hydrochloric Acid Solubilization", 1 pg. 1983. Abstact J Assoc Off. Anal. Chem. Jul. 1983; 66(4)985–8.

M Nedeljkovic et al., "Direct Determination of Lead in Blood by Differential Pulse Stripping Voltammetry", 1 pg. 1987. Abstract Clin. Chim Acta Sep. 30, 1987; 168(2): 169–15.

BJ Feldman et al., "Determination of Lead in Blood by Square Wave Anodic Stripping Voltammetry at a Carbon Disk Ultramicroelectrode", 1 pg. 1994. Abstract Anal. Chem. Jul. 1, 1994; 66(13): 1983–7.

PM Martin et al., "Laser Micromachined and Laminated Microchannel Components for Chemical Sensors and Heat Transfer Applications", pp. 258–268, 1997. SPIE vol. 3224.

Y Lin et al., "Integration of Microfluidics/Electrochemical system for Trace Metal Analysis by Stripping Voltammetry", p. 1–9, 1999. SPIE vol. 3877, 1–9.

MT Carter et al., "Hybrid Electrochemical/Microfluidic Monitors for Trace Heavy Metals", p. 251–260, 1999.

C Bohs et al., "Radial–flow Thin–Layer Electrochemical Cell (UniJet Cell) From Bioanalytical Systems, Inc. (Ref. 1)", Current Separations 12:4 (Proc Art). 1994.

* cited by examiner

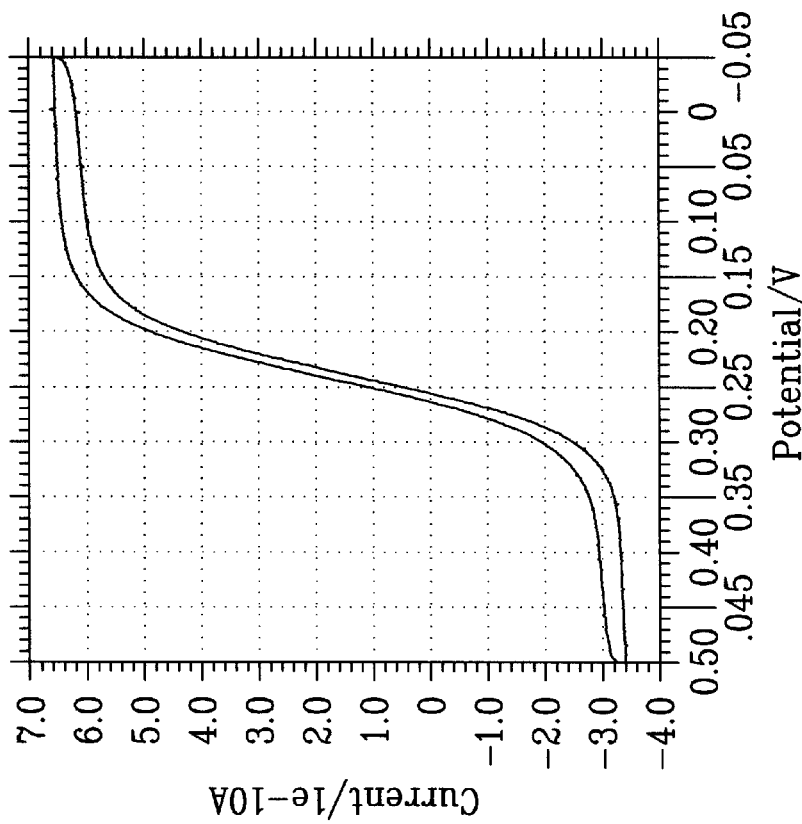
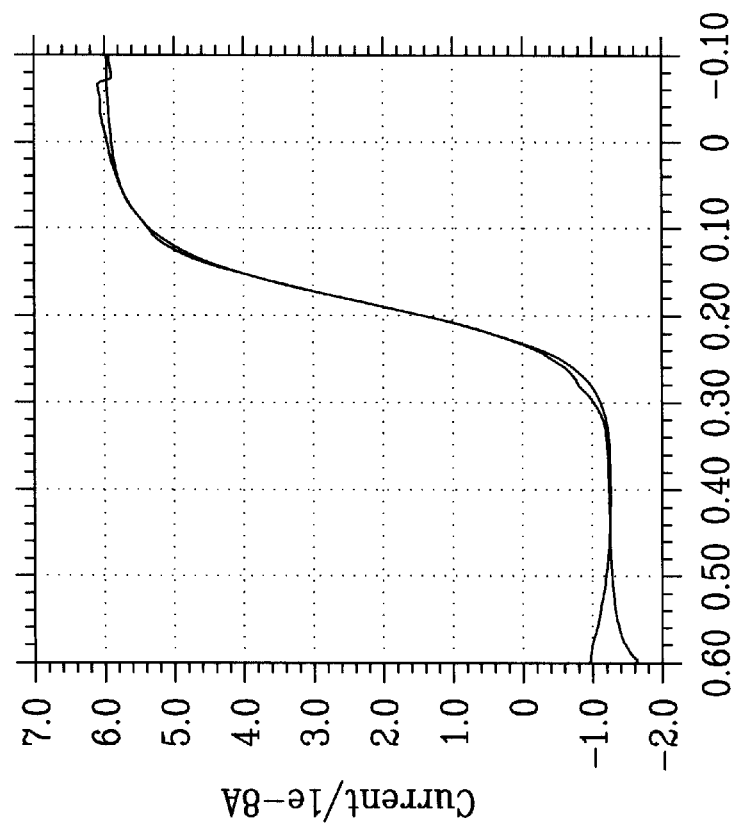
Fig. 6b
Fig. 6a

COMPACT ELECTROCHEMICAL SENSOR SYSTEM AND METHOD FOR FIELD TESTING FOR METALS IN SALIVA OR OTHER FLUIDS

RELATED APPLICATIONS

This application is a Continuation-In-Part of U.S. patent application Ser. No. 09/399,821, filed Sep. 21, 1999, now U.S. Pat. No. 6,494,614, which is incorporated herein in full, as if reproduced below.

This invention was made with Government support under contract DE-AC0676RLO 1830 awarded by the U.S. Department of Energy. The Government has certain rights in this invention.

FIELD OF THE INVENTION

The present invention relates to compact electrochemical sensor systems, methods for plug-and-play assembly of compact electrochemical sensor systems, and methods for field testing for metals.

INTRODUCTION

Because of the toxicity of environmental contaminants, a reliable analytical system is desired for monitoring them in complex environmental matrices. For metal species, such assays are usually carried out in central laboratories using ICP-AES or ICP-MS. However, in view of the huge labor and analytical costs or time delays associated with centralized laboratory analyses there are immediate needs for developing portable analytical systems for on-site monitoring. Development of a portable system for analysis of environmental contaminants will greatly improve the quality and efficiency for on-site characterization of chemical contamination and will allow real-time monitoring of exposure to toxic metals.

Microfabrication technology has been utilized to integrate whole laboratory systems onto microchips. These systems have been termed microscale total analytical systems[1] ($\mu$-TAS), and their development has become an active research area. Numerous $\mu$-TAS systems have been developed and reported in the literature, and have shown very promising capabilities[1-7]. The advantages of the $\mu$-TAS approach include the ability to analyze extremely small volume samples, increased speed of analysis, reduction in reagent consumption, and consequent reduction in waste disposal.

Most fabrication processes for microfluidic chemical and biological systems involve photolithography and the associated wet etching processes to form the microchannels, valves, and interconnects. Historically, silicon and glasses have been the most widely used materials [1-4]. Most devices constructed from these materials are planar, which makes it difficult to incorporate a number of functions into the microfluidic component and to efficiently direct fluid flow to the required site.

Analyte detection remains an important issue for microchip devices. Most analyses have been conducted using large detectors, such as laser-induced fluorescence[3-4] and mass spectrometry[5-8]. In some applications, electrochemical detection can be sensitive, compact and integrated into a small size[9-10].

Biological monitoring is recognized as a critically important approach for accurately estimating absorbed doses of chemicals from all potential exposure routes. However, the application of biomonitoring is hampered by numerous factors including, the need for complicated and/or expensive analytical methods, difficulty in obtaining needed biological specimens and the lack of understanding of the pharmacokinetic properties of a chemical, all of which are needed to accurately estimate internal dose.

To facilitate the use of biomonitoring, there is a need to develop reliable, portable and cost-effective analytical instruments for on-site monitoring of chemicals, employing a relevant biological matrix readily obtainable from workers.

REFERENCES

1. A. Manz, J. C. Fettinger, E. Verpoorte, H. Lundi, H. M. Widmer, and D. J. Harrison, "Micromachining of monocrystaline silicon and glass for chemical analysis systems: a look into next century's technology or just a fashionable craze?" Trends in Anal. Chem., 10, 144, 1991
2. G. T. A. Kovacs, K. Petersen, M. Albin, "Silicon micromachining: sensors to systems," Anal. Chem.; 68, pp407A–412A, 1996
3. L. C. Waters, S. C. Jacobson, N. Kroutchinina, J. Khandurina, R. S. Foote, J. M. Ramsey, "Multiple sample PCR amplification and electrophoretic analysis on a microchip," Anal. Chem. 70, pp. 5172–5176, 1998
4. G. Ocvirk, T. Tang, D. J. Harrison, "Optimization of confocal epifluorescence microscopy for microchip-based miniaturized total analysis systems," Analyst, 123, pp. 1429–1434, 1998
5. Y. Lin, N. Xu, D. W. Matson, R. D. Smith, "Microfabricated dual-microdialysis and capillary isoelectric focusing devices for cleanup and separation/mass spectrometric analysis of biomolecules," in the Micro Total Analysis Systems '98; Ed.: Harrison, D. J. and den Berg, A. V.; pp3343–346; Kluwer Academic Publishers, Boston, 1998
6. N. Xu, Lin, Y., S. A. Hofstadler, D. W. Matson, C. J. Call, R. D. Smith, "A microfabricated dialysis device for sample cleanup in electrospray ionization mass spectrometry," Anal. Chem. 70, pp. 3553–3556, 1998
7. F. Xiang, Y. Lin, J. Wen, D. W. Matson, R. D. Smith, "An integrated microfabricated device for dual dialysis and ESI coupled to ion trap mass spectometry for rapid analysis of complex biological samples," Anal. Chem., 71 pp1485–1490, 1999
8. Q. Xue, F. Foret, Y. M. Dunayevskiy, P. M. Zavracky, N. E. McGruer, B. L. Karger, "Multichannel microchip electrospray mass spectrometry," Anal. Chem., 69, pp. 426–430, 1997
9. C. Belmont, M. L. Tercier, J. Buffle, G. C. Fiaccabrino, Koudelka-Hep, "Mercury-plated iridium-based microelectrode array for trace metals detection by voltammetry: optimum conditions and reliability," Anal. Chim. Acta, 329, pp203–214, 1996
10. S. P. Kounaves, W. Deng, P. R. Hallock, G. T. A. Kovacs, C. W. Storment, "Iridium-based ultramicroelectrode array fabricated by microlithography," Anal. Chem., 66, pp418–423, 1994
11. C. E. Bohs, M. C. Linhares, P. T. Kissinger, Current Separations, 13, pp6–8, 1994
12. F. Zhou, J. T. Aronson, M. W. Ruegnitz, "Highthroughput fast-scan anodic stripping voltanmmetry in a microflow system," Anal. Chem., 69, pp728–733, 1997

SUMMARY OF THE INVENTION

The present invention provides a compact, integrated electrochemical sensor system having at least three components: a pump, a mixing layer, and an electrochemical cell.

The mixing layer has a mixing channel having at least one inlet and at least one outlet. A via (preferably a tube) connects an outlet of the mixing channel with an inlet to the electrochemical cell. The device can be described in terms of layers to indicate the compactness of the device and because a layer configuration can be easily assembled and transported. In preferred embodiments, various components, for example reservoirs, pumps, mixing layers and electrochemical cells, can be readily attached or detached from the device. This method of attaching components is referred to as "plug-and-play" in which various components can be plugged into (or unplugged from) the device without needing to use adhesive, clamping or other cumbersome means to attach the components. In another preferred aspect, the mixing layer has separate channels: one for liquid transport from a reservoir, and a mixing channel—this novel configuration allows very space efficient packing of components and is compatible with the plug-and-play concept.

The invention also includes methods measuring metals in fluids by running samples through a compact, integrated electrochemical sensor. In preferred embodiments, the inventive methods are used for field testing for metals in blood or saliva.

The invention described herein can use a significantly different design and fabrication approach, as compared with conventional lab-on-a-chip technology. In the present invention, functional laminates arranged in a stacked architecture. Each laminate layer performs a specific function, such as fluid reservoirs, mixing chamber, or a reaction chamber. Microsensors, micropumps, and valves can easily be integrated into such a laminated structure.

Various designs of the invention can provide numerous advantages such as portability, ease of cleaning, and the ability to substitute, add or remove parts. Furthermore, the inventive sensors can be microfabricated at relatively low cost. The invention can also provide a low-cost and rapid method for on-site and in situ determination of toxic metals in environmental water and for non-invasive monitoring for occupational exposure to metals such as lead.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 6 is a Cyclic Voltammogram of 0.5 mM Ferricyanide in 0.4 M $KNO_3$ with a Microfabricated Ir Electrode (A) and Ir Microelectrode in a Conventional Cell

DESCRIPTION OF THE PREFERRED EMBODIMENT(S)

Figure 1:
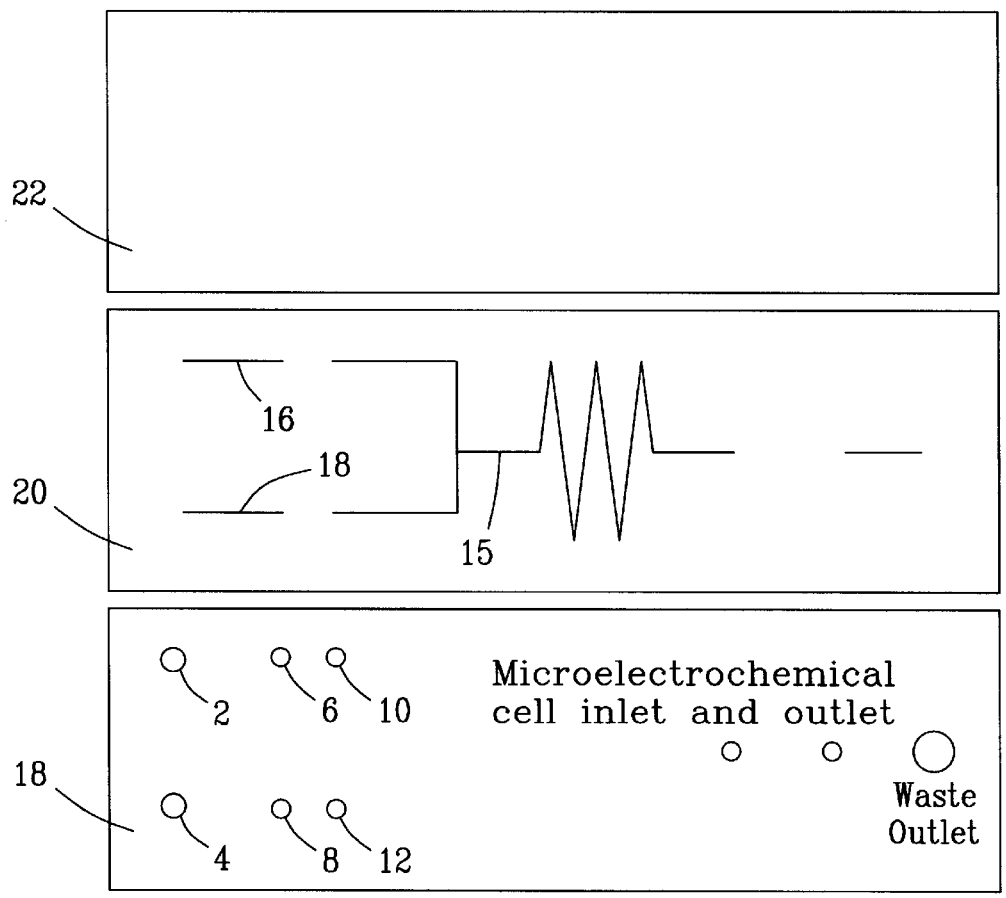
FIG. 1 illustrates a mixing channel with top and bottom plates.
Figure 2:
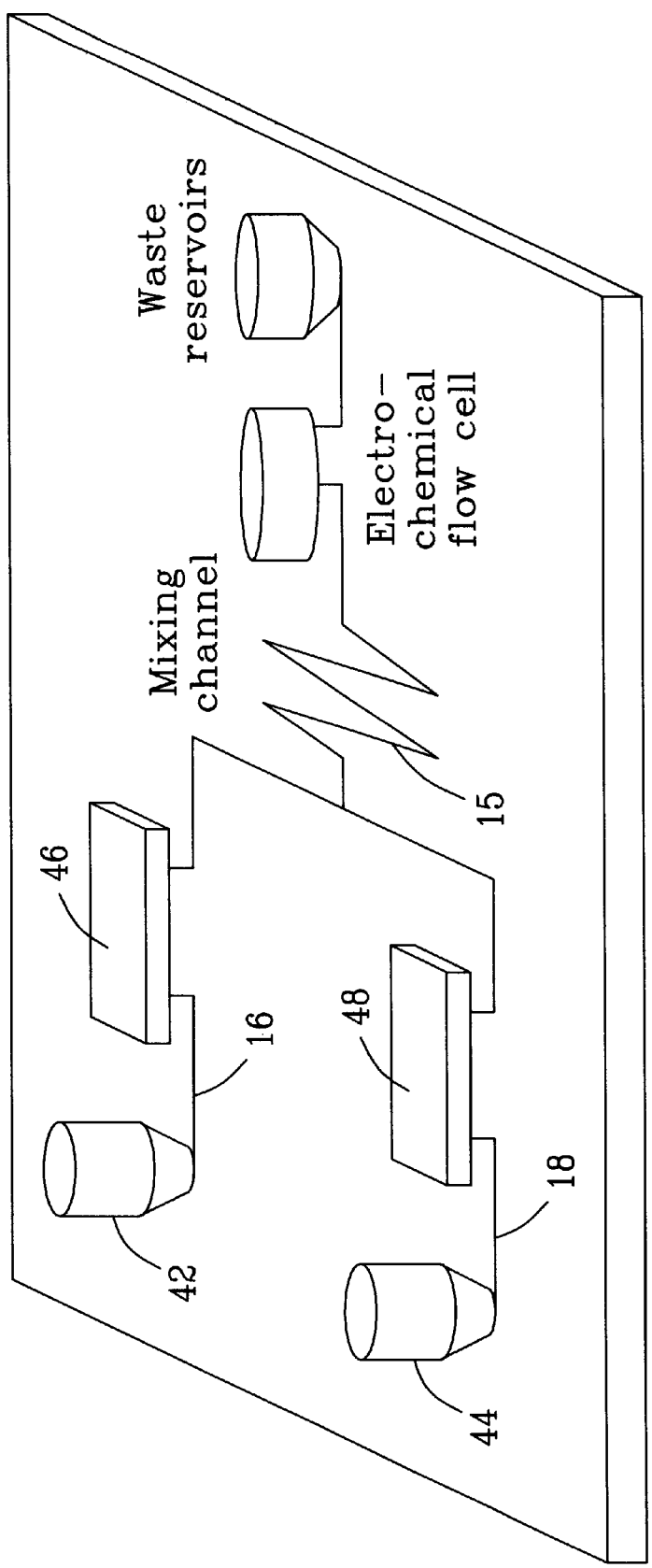
FIG. 2 is a schematic diagram showing reservoirs, micropumps, electrochemical cells and waste reservoirs plugged into a laminate containing a mixing channel.

Individual layers of a preferred embodiment of the invention are illustrated in FIGS. 1 and 2. A top plate has reservoir inlets 2, 4 and flow channel outlets 6, 8. The flow channel outlets are connected to micropump inlets. Micropumps 46, 48 are commercially available and are not further described herein. The outlets of the micropumps 10, 12 are connected to holes connecting to a mixing channel.

Reservoirs 42, 44 preferably may be plugged into inlets 2, 4 in the top plate 18. The connection to the inlets 2, 4 can be accomplished via tubes but is more preferably by direct connection with the reservoirs 42, 44. In a preferred embodiment, one reservoir contains analyte while the other contains a reagent solution. Preferably, one or both reservoirs are cartridges that plug into the top plate. Typically, the reservoirs have volumes of 0.01 to 5 ml, preferably less than 1 ml.

The analyte and reagent are mixed in a mixing layer 20. Preferably, this mixing is conducted in a microchannel (i.e., a channel having a dimension of less than about 1 mm), more preferably, the mixing channel has a width of 100 to 800 micron (μm), and a depth of 50 to 500 μm. For optimal mixing in a small area, the mixing channel should have a serpentine configuration. A mixing channel is defined as a channel that contains at least two separate channels and at least one channel in which flow from the separate channels are mixed (typically by diffuision). In a preferred embodiment, the mixing layer also contains flow channels—this configuration saves space and material. The flow channels 16, 18 are also preferably microchannels, more preferably, the flow channels have a width of 100 to 800 μm, and a depth of 50 to 500 μm. Preferably, the flow channels are not contiguous with the mixing channel in the mixing layer. Flow from the flow channels can move through the pumps or through another layer before entering the mixing channel.

Figure 3:
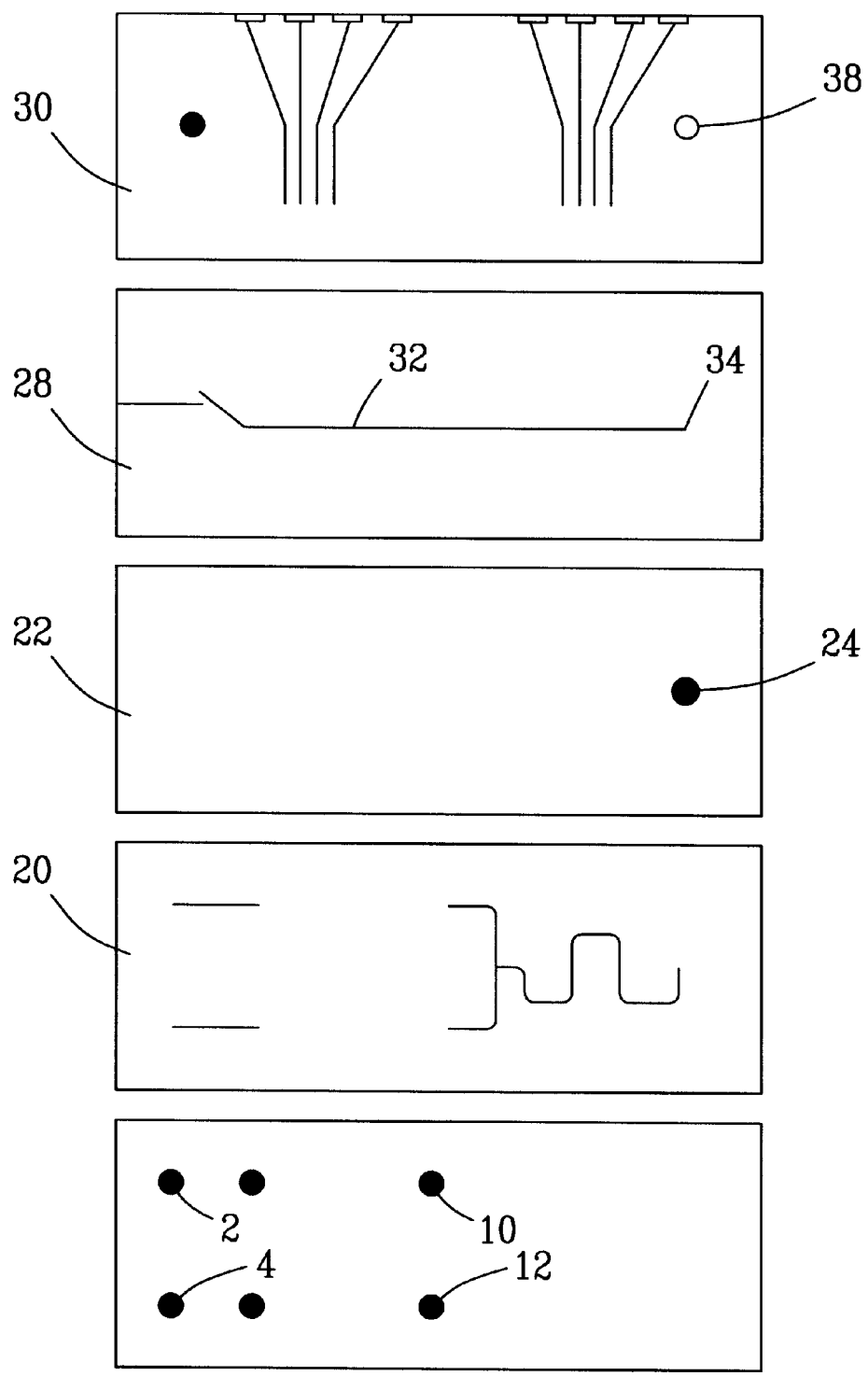
FIG. 3 illustrates a laminate in an electrochemical sensor system.

A bottom film 22 is disposed under the mixing layer. In an alternative embodiment, illustrated in FIG. 3, the bottom film has an outlet 24 that is connected to an electrochemical cell 28, 30. The top layer 28 of the electrochemical cell has a sensor channel 32 having inlet 34 and outlet ends. The bottom plate 30 is a glass plate having electrodes and conductive leads. The electrodes and conductive leads can be patterned by conventional photolithographic methods.

Figure 4:
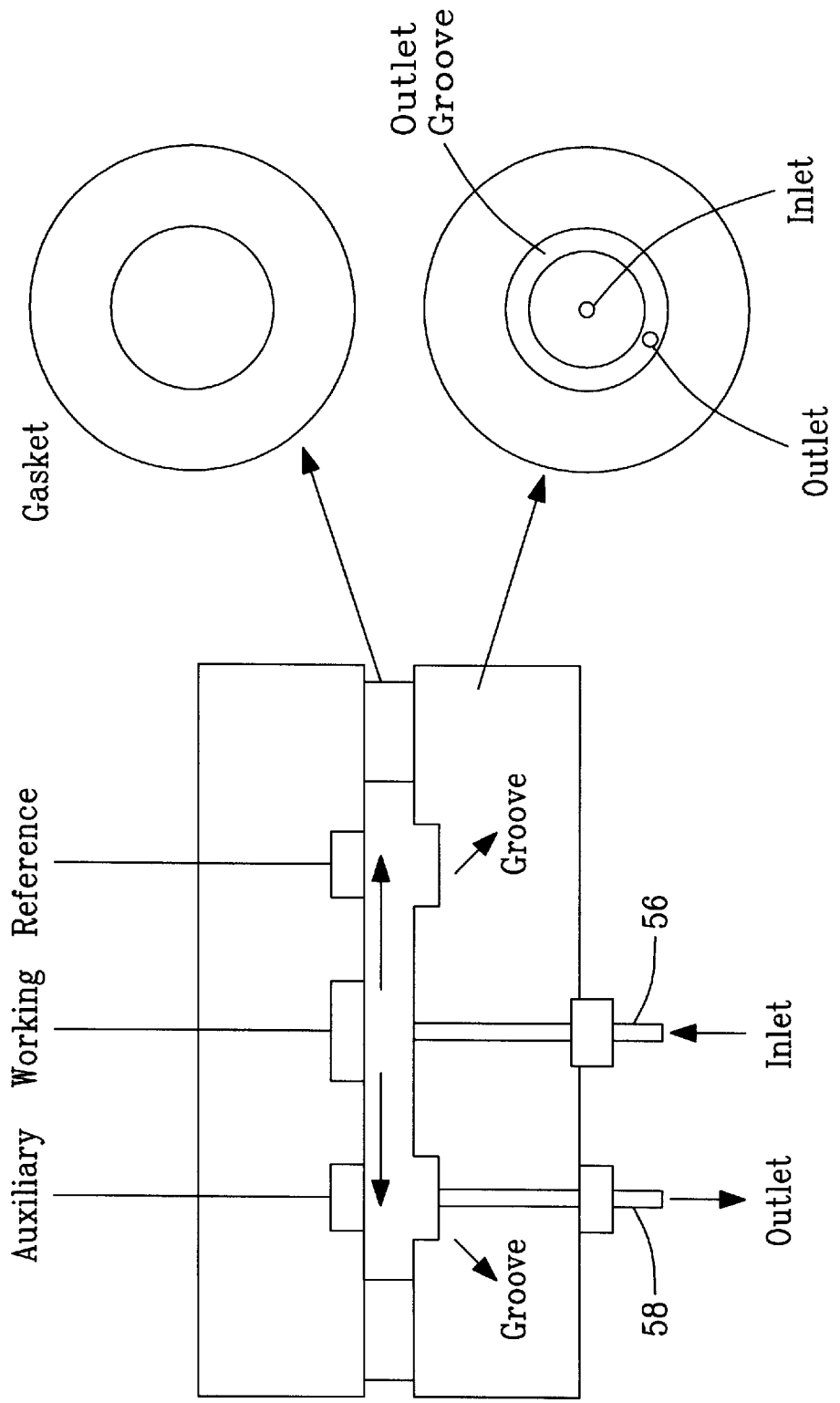
FIG. 4 illustrates a wall-jet electrochemical cell.

An alternative embodiment, partially illustrated in FIG. 4, uses a wall-jet design with inlet and outlet connections. These inlet and outlet connections 56, 58, combined with plastic tubing and the outlet in the bottom film enable plug-and-play connectivity so that the electrochemical cell can be quickly removed and, if desired, a different electrochemical cell can be plugged in.

Preferred embodiments of the invention include the plug-and-play concept. This feature allows significant improvements in rapid change-out and repair of individual components.

Electronics can be integrated in an electronic board. This integrated electronic board can be the bottom layer of microfluidics/electrochemical sensor system. The electronic board can integrate electronic drivers for piezoelectric micropumps. A miniaturized potentiostat for electrochemical sensor can also be integrated in the same electronic board. Both micropump drives and potentiostat can be controlled by a laptop computer or a microprocessor. Electronic connections for micropumps and electrochemical sensor can be achieved through standard interfaces from the bottom or edge of the microfluidic platform. During the measurement, the electrochemical reaction of metals will generate output signals (current). The output signals of the electrochemical sensor will be converted to voltage. After pre amplified by a signal amplifier integrated on electronic board, signals will be converted to digital signals, then collected and processed by the computer. After calibration of the analytical system with a set of standard solutions of metal, the analytical system is ready for detection of metal concentration (e.g. Pb) in samples.

The ability of separate components to be assembled in a plug-and-play fashion is an important characteristic of preferred embodiments of the invention. The components should be designed such that they can be reversibly combined, without the need for adhesives, clamps, swage locks or the like, to couple the components. In a preferred embodiment, the components can be connected by plastic tubing. It has been found that PEEK tubing with an inner diameter of 50 microns and an outer diameter to fit the holes is highly effective. Where the front plate is polycarbonate or other hard plastic it was found that an o-ring was required for a good, leak-proof connection. Preferably, the device does not require o-rings.

Although the illustrated device shows only 5 layers in the laminate, it should be understood that the fabrication process is highly flexible and that additional layers can be incorporated in the laminate.

The materials the mixing layer, top and bottom plates, and sensor channel are preferably plastic. It has been discovered that the use of relatively soft and flexible plastics allows for leak-free tubing connections—in this fashion, sensor components having plug-and-play capabilities can be easily and economically manufactured. A particularly preferred soft plastic is fluorinated ethylene propylene (FEP) Teflon. To avoid possible contamination problems, the various components of the sensor system (except for the electrodes) should have little or no metal in contact with the fluid flow path.

Preferably the entire integrated electrochemical analyzer (or system), including pumps, reservoirs, mixing layer(s), electrochemical cell and accompanying electronics, is disposed within a case or housing having a volume of less than about 500 $cm^3$, more preferably between about 70 and 300 $cm^3$. The height of the device (where height is measured in the direction of net fluid flow) is preferably less than 5 cm (including pump, mixing layer and electrochemical cell).

Figure 5:
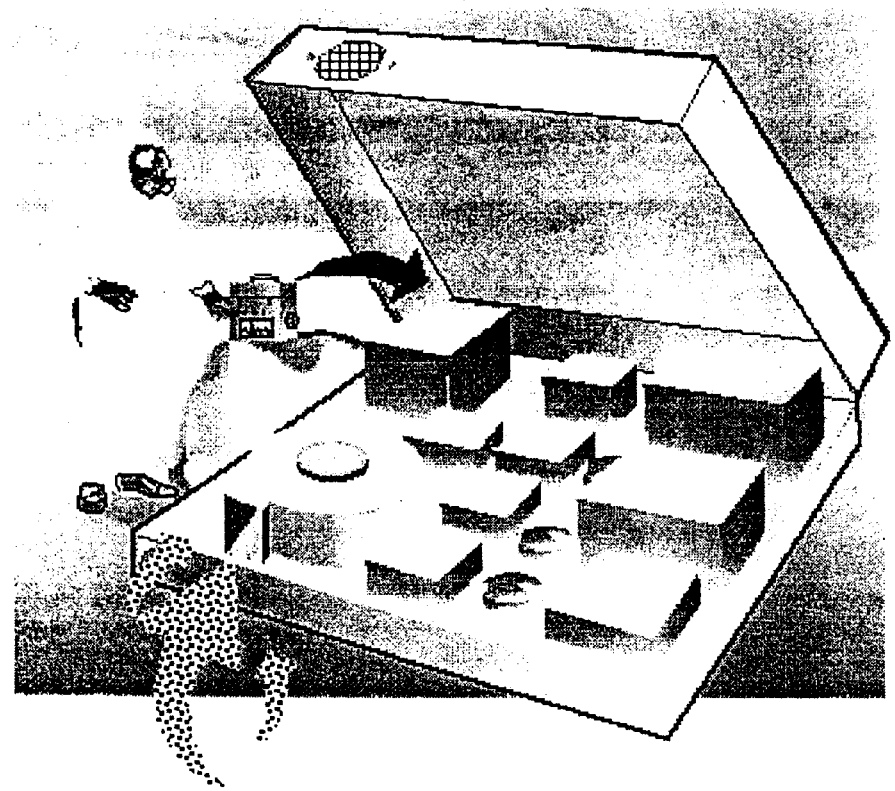
FIG. 5 illustrates an integrated electrochemical system in a hand-held carrying case.

In some preferred embodiments, components of are stored in a carry case (having a size such as a lunch box or first aid kit), preferably a carry case having a volume of less than about 300 $cm^3$. This carry case could include multiple reservoirs, multiple electrochemical cells, and, optionally, multiple mixing channels—this would allow the worker to field test for multiple trace metals in multiple individuals. In one preferred embodiment, illustrated in FIG. 5, an entire working system, connected and fully operable, is contained within a portable case that can be easily hand-carried by an individual to a desired location. In another preferred embodiment, a kit contains an entire electrochemical sensor system that can be assembled from its component parts, in the field, without using any tools. Typically, the sensor system can analyze can operate using a total analyte volume of about 50 to 500 microliters, and can detect a metal such as lead in levels as low as, for example, 0.10 parts per billion (ppb).

To assign a biological meaning to an electrochemical measurement of lead an analytical approach was used in which known concentrations of lead were evaluated by the micro-analytical system to determine the linearity of the response over a broad concentration range. This allows for a direct comparison of the electrochemical signal with a known concentration of lead in a sample. Secondly, to assign biological meaning to the micro-analytical quantitation in biological specimens, whole blood and saliva samples were analyzed by both inductively coupled plasma-mass spectrometry (ICP-MS) and the micro-analytical system to quantitate lead in biological matrixes across a range of concentrations. This second comparison enables us to have confidence that the response seen in the biological samples with the micro-analytical system are linear over a broad range of concentrations. Finally, by coupling the quantitation of lead in biological specimens (blood or saliva) with a physiologically based pharmacokinetic model for lead it will be possible to accurately predict the total body burden of lead in an individual based on a saliva measurement.

There are three basic elements associated with field testing of a micro-analytical system for saliva biomonitoring for lead. First, there is a need to establish an animal model to compare the responses of the micro-analytical system against current state-of-the-art analytical methods such as ICP-MS. The second objective is to evaluate the responsiveness of the micro-analytical system with biological samples obtained from humans under controlled laboratory conditions. Since blood lead is routinely collected and utilized for determining lead body-burden, studies would be initiated in which participants were asked to provide both blood and saliva specimens for laboratory analysis of lead. These biological specimens would be sent to the laboratory and subjected to a standard analytical method for lead analysis like ICP-MS and compared against the response seen with the micro-analytical systems. These experiments would provide quantitative data indicating that the micro-analytical system was capable, under controlled laboratory conditions, of accurately measuring blood or saliva lead concentration in humans. The third phase of the field-testing would entail deploying the micro-analytical device in a study in which saliva samples were taken in a non-laboratory environment (i.e. person's workplace) and the concentration of lead in saliva was determined. In addition, blood and additional saliva samples would be taken and shipped to the laboratory for standard analysis by ICP-MS. This third phase of the field evaluation would confirm the feasibility of deploying a micro-analytical device outside of the laboratory and would provide strong scientific validation that real-time saliva analysis could be used to substitute for standard blood analysis procedures.

EXAMPLES

Fabrication Process

An UV excimer direct-write laser micromachining system (Potomac LMT-4000) was used to produce microchannels of various geometries in polymeric materials. The system contained a Potomac TGX-1000 KrF (248 nm) excimer laser configured for focused (direct write) operation at the machining surface. The minimum spot size of an unapertured laser beam at the work surface was approximately 10 microns. The maximum pulse repetition rate was 2 KHz with a maximum pulse energy of 45 µJ. Machining was performed on set of 4-inch computer-controlled X-Y stages with the channel geometry defined by inputting a CAD file.

Microchannels for the microfluidic devices described here were produced by machining the channel into a thin polymer (e.g., polyimide) gasket. For this approach, the laser cut was made through the gasket material. Only the perimeter of the channel needed to be machined, with the remaining center portion of the channel being stripped out and discarded. When sandwiched between two solid pieces of polymer, the gasket formed a well-defined microchannel whose depth was determined by the thickness of the gasket material. This method was used to produce microchannels up to 500 microns wide and 225 microns deep. These micromachined gaskets were produced from sheet material having adhesive on both sides to improve sealing capabilities. Microfluidic devices were designed such that they can be assembled in a stacked geometry. In doing so, fluid flows were directed through a series of layers in the device, each layer having a distinct functionality. Minimum dead volume in the device was achieved by directing the fluid flow from one layer to the next using small diameter drilled vias. Where required for electrical conductivity, appropriate patterns were generated using standard photolithographic processes and conductive metal or insulator layers were applied by magnetron sputtering.

Electrochemical Detection

Cyclic voltammetry and square wave voltammetry were performed with either a lab-built potentiostat or a CHI 623 electrochemical analyzer (CH Instrument, Cordova, Tenn.).

Example 1

Microfluidic Device with Electrochemical Sensor Fabricated Using Standard Photolithographic Process The fabrication scheme was based on a multilayer lamination method utilizing stacking modules, each having a distinct functionality, to achieve a compact microanalytical device (FIG. 1). With the exception of the detector module, all components were fabricated from FEP Teflon or polyimide. The detector module was produced on BK7 glass, with sputtered electrodes and insulator layers. All microchannels including the mixing/reaction channel and detector channel, were produced by sandwiching laser-machined adhesive-backed polyimide gaskets between layers of the device. Individual components, such as the microfabricated piezoelectrically actuated pumps (modified from IMM pump) and the sample and reagent reservoirs were designed as plug-in parts, allowing for rapid change and repair if necessary. The base dimensions of the fabricated part were 5.0×8.0 cm. The overall height of the device, including pumps, but without reservoirs, was approximately 2.5 cm.

The sensor system consisted of four functional components comprised of five laminations shown in FIG. 1. Components contained within the laminated sensor device included: 1). Sample and reagent reservoirs; 2) Micropumps; 3). Mixing and reaction channel; 4). Electrochemical sensors module.

Two fluid reservoirs were used, one held sample and the other, an electrolyte solution or reagent. Fluid was pumped from the reservoirs by two integrated plug-in micro piezoelectric pumps. Typical pumping flow rates were 10–300 µl/min. The two fluids were then pumped into a serpentine mixing/reaction channel, which facilitated initial mixing of the fluids and allowed time for the reactions to occur between sample and reagent. The mixing/reaction channel was laser machined from 125 µm polyimide with adhesive on both faces and the channel was sealed between adjacent solid polymer sheets using the gasket process described above. The channel width was 200 µm. The sample was next pumped through a 200 µm-wide detector channel where it flowed over iridium, gold, and silver electrodes for the voltammetric measurements. The detector base was polished 0.16-cm-thick BK7 glass. All metallization was deposited by magnetron sputtering. Gold connecting leads and sensor bases were first deposited on the substrate and formed using the lift off technique. Miniaturized power supplies for micropumps were integrated on an electronic board which is located on the bottom of the microfluidic device. This design made the entire system highly compact. The entire analytical system was controlled using a laptop computer.

The microfabricated electrochemical cell consisted of an Ir working electrode, a Pt auxiliary electrode, and an Ag electrode. In order to make the device fully functional, the sputtered Ag electrode had to be converted into an Ag/AgCl reference electrode. Conversion of thin-film Ag into Ag/AgCl reference electrode presented a challenging technical issue. Complete oxidation of Ag would damage the Ag electrode. Optimally, the Ag was oxidized under a low constant current (1 µA) in 0.1 M KCl solution for 5 min. Evaluation of the micro electrochemical system was conducted by studying the cyclic voltammetric property of 0.5 mM $K_3Fe(CN)_6$ solution. In order to form the Ag/AgCl reference electrode, 0.3 M KCl was added to the solution. For comparison purpose, cyclic voltammogram of 0.5 M $K_3Fe(CN)_6$ solution was also measured with an Ir microelectrode (10 µm) in a conventional electrochemical cell (5 mL) with a 3 M Ag/AgCl as a reference electrode. As shown in FIG. 6, a well-defined sigmoidal response was obtained for both the microfabricated Ir electrode and the Ir microelectrode in a conventional electrochemical cell. These results indicate that a diffusion controlled process and a steady-state current were achieved in the microfabricated electrochemical cell.

Example 2

Microfluidic Device with Electrochemical Sensor Fabricated Based on Wall-jet Design In this design, the microelectrochemical flow cell was incorporated as a plug-in module rather than being laminated on the bottom layer of the microfluidic device. The microelectrochemical flow cell which integrates three electrodes, was based on a wall-jet design and was fabricated on polymer substrates. The microelectrochemical flow cell could then be plugged directly into the microfluidic platform. Although less compact that the multilayer device described above, this fabrication scheme allows for more analytical flexibility. Specifically, different electrochemical cells having different analyte sensing capabilities can be quickly replaced and plugged into the microfluidic platform. Microelectrochemical cells with different working electrodes, such as glassy carbon, micro Ir, Pt, and Au, have been fabricated for different applications. The microelectrochemical flow cell has a wall-jet (flow-onto) configuration similar to that in the BAS (BAS, West Lafayette, Ind.) UniJet cell design[11-12]. Instead of a stainless steel block in the BAS UniJet radial flow cell design, a PEEK block with a groove of small volume (about 5 µL) was used in order to eliminate the potential trace metal contamination due to the corrosion of stainless steel. A laser-cut Teflon gasket was sandwiched between two PEEK blocks to form a radial flow cell. A 1 mm diameter Pt and Ag/AgCl was used as auxiliary and reference electrode, respectively. The solution flowed onto the Hg-film working electrode and exited through the groove from the outlet that was positioned directly across the Pt auxiliary electrode.

Figure 7A:
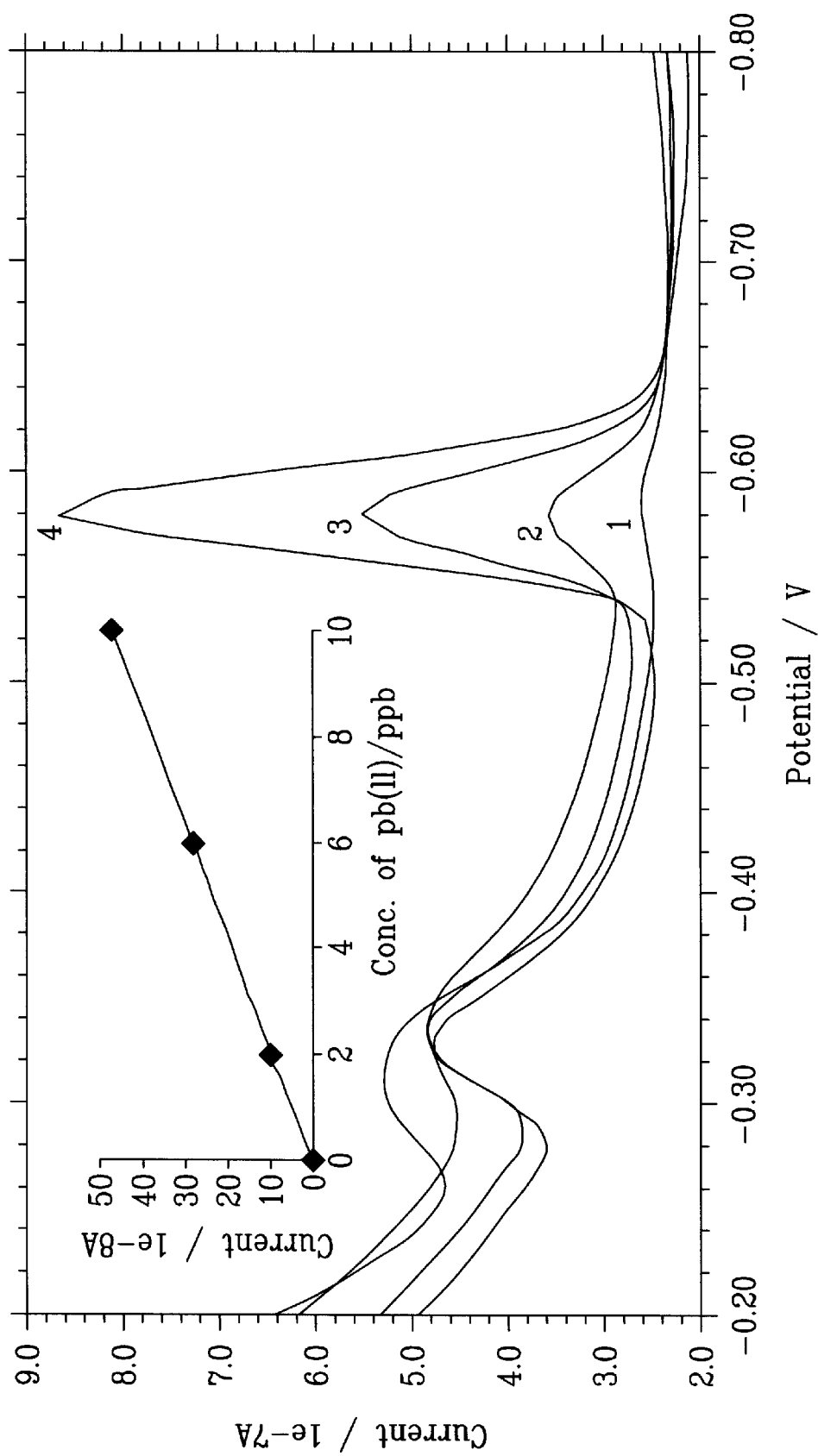
FIG. 7 shows SWASV Voltammograms for Pb(II) in 0.1 M HCl solution. Conditions: deposition potential, −1.1 V; deposition time, 3 min.; pulse amplitude, 25 mV; step amplitude, 10 mV; frequency, 15 Hz; flow rate, 20 μl/min Pb(II) concentration: (A) 0, 2, 6, and 10 ppb for Peak 1–4, respectively; and (B) 0, 10, 50, 100, and 200 ppb for Peak 1–5, respectively.
Figure 7B:
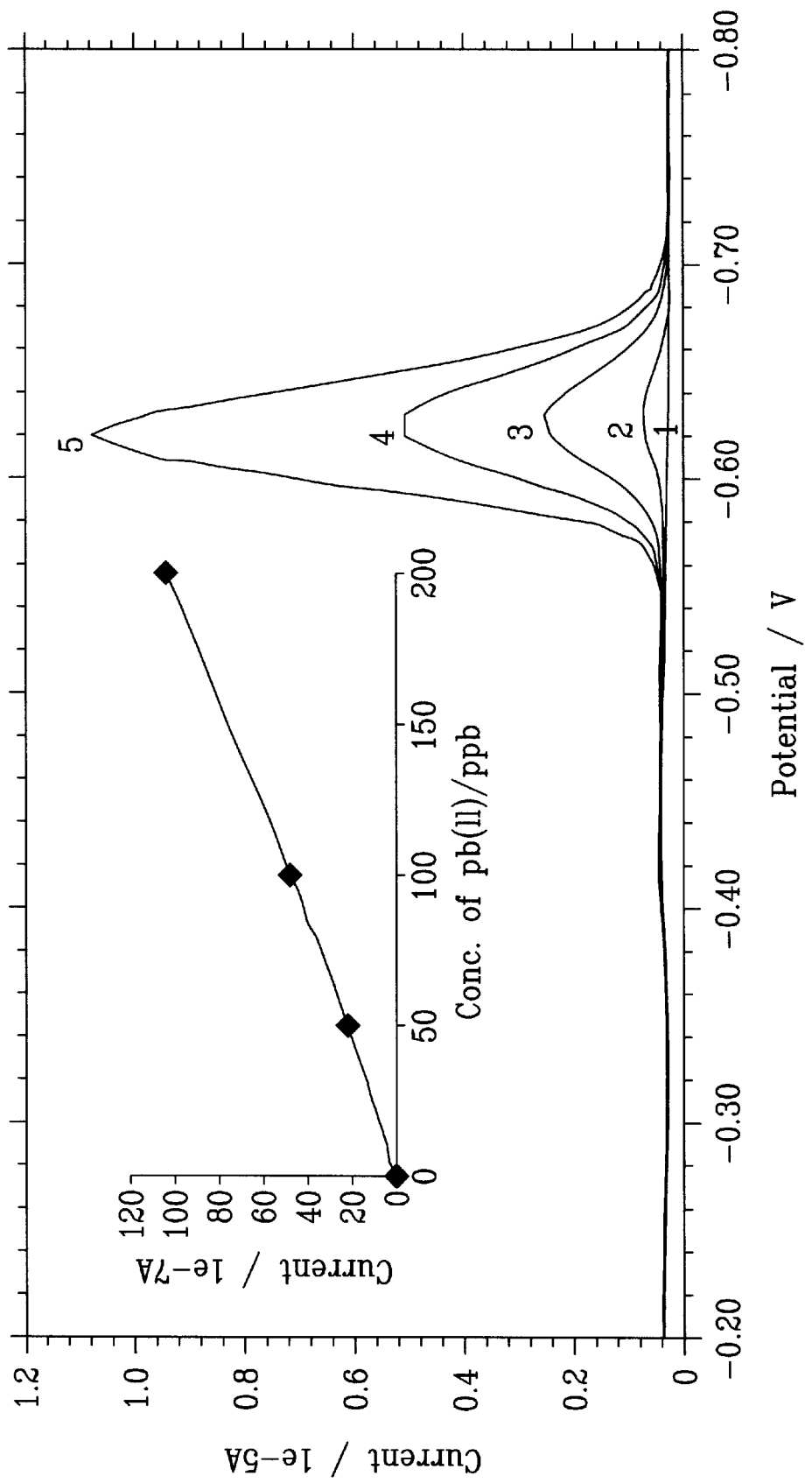

The integrated microfluidic device with the on-surface microelectrochemical cell was used to detect lead using Square Wave Anodic Stripping Voltammetry (SWASV). For lead detection, a constant potential of −1.10 V is applied on a glassy carbon mercury film electrode. When sample solution flowed through the electrode surface, $Pb^{2+}$ was reduced and accumulated. After accumulation for 3 min, the potential of the mercury film electrode was scanned from −1.10 V to −0.10 V. Pb was measured with square wave voltammetry. After measurement, the Pb was stripped from the electrode surface and the sensor could be reused. FIG. 7 shows the SWASV voltammograms and calibration curves obtained for 2–200 ppb $Pb^{2+}$ in aqueous solutions using this device. These results indicate that 2 ppb $Pb^{2+}$ in a water sample could be detected in a 3 min preconcentration time period.

Figure 8:
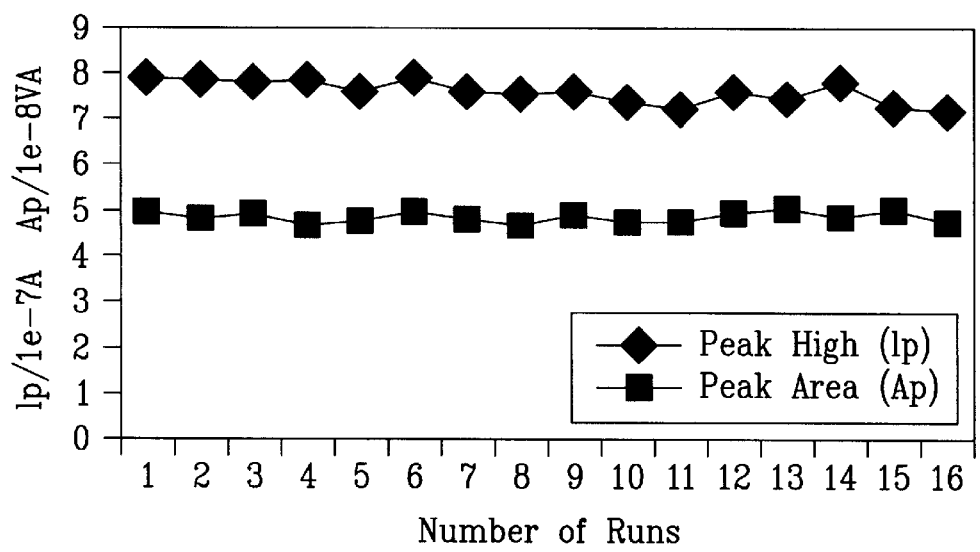
FIG. 8 is a plot showing the reliability of the measurement, showing peak currents and peak areas for Pb (II) over 16 runs with a Hg-film electrode.
Figure 9:
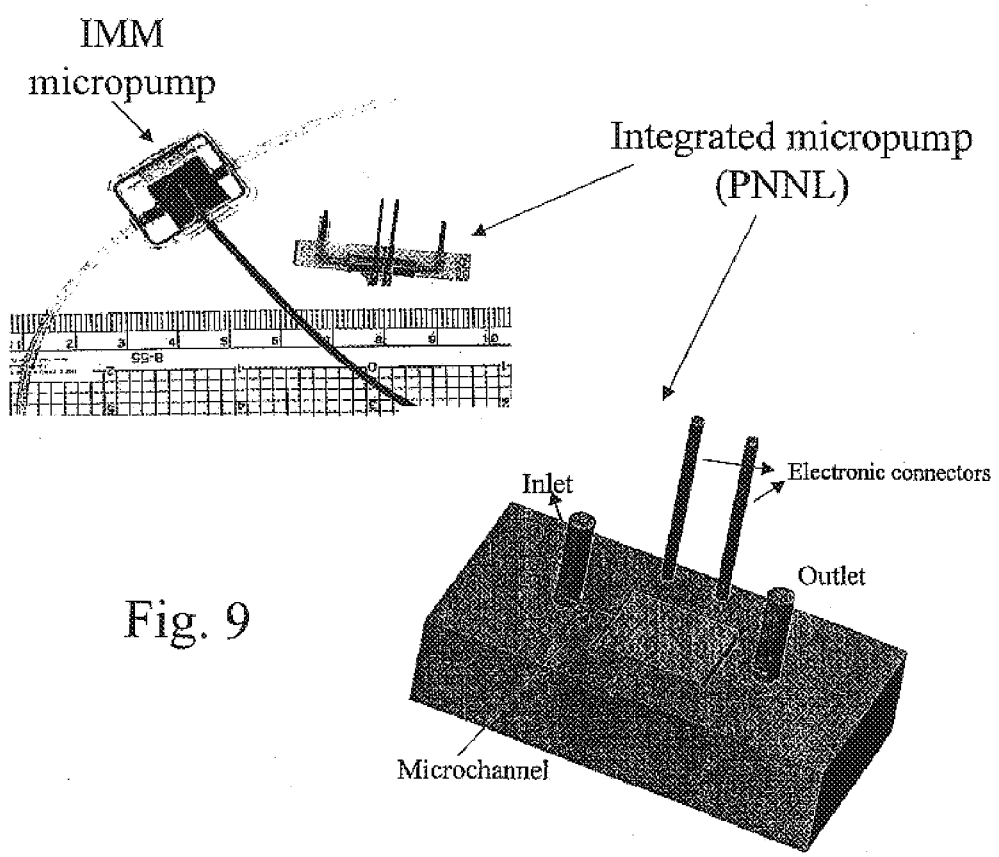
FIG. 9 illustrates a method a modified IMM piezoelectric micropump in which the micropump was cut and integrated into a polycarbonate substrate having an inlet and outlet made of PEEK tubing bonded to the polycarbonate substrate by epoxy.

The stability of mercury-film electrode is a key issue for stripping analysis. The mercury-film electrode was prepared by electrodeposition of Hg at 10 ppm $HgCl_2$ for 10 min. We evaluated mercury-film electrodes both in batch analysis and in flow stream. Our results indicated that, the stability of mercury-film electrode in flow stream is much higher than in batch analysis. In batch analysis, a mercury-film electrode only can be used for a few runs. In flow stream, mercury-film electrode can be continuously used for at least one day without degradation of mercury-film. FIG. 8 shows the stripping response of 16 consecutive runs for a 6 ppb Pb solution using the same mercury coating on glassy carbon electrode of the microelectrochemical cell. The results showed a relative standard deviation of 5% and 4% for peak current and peak area, respectively.

Example 3

Environmental Applications

Analysis of Pb in Water

The micro analytical system with the on-surface microelectrochemical cell was used for the analysis of $Pb^{2+}$ in water samples collected from rivers and tap water at laboratory. The samples were filtered with 0.45 μm membrane, acidified to 0.1 M HCl, and then analyzed with the microanalytical system. As indicated in Table 1. Analytical results obtained from the micro analytical system were comparable with those obtained using ICP/MS.

TABLE 1

Summary of Analytical Results of Water Samples

| Sample | Results of micro Analytical System (ppb) | Results of ICP-MS (ppb) |
|---|---|---|
| River Water 1 | 4.50 | 4.87 |
| River Water 2 | 1.2 | 0.82 |
| Lab Tap Water | 20.5 | 21.8 |

Analysis of Biological Fluid Samples by Micro-Analytical System

Different sample pretreatment procedures for the effective release of the Pb from its binding sites in the biological fluids have been previously reviewed. (Wang, J.: Stripping analysis of trace metals in human body fluids. *J. Electroanal. Chem.*, 139: 225–232 (1982)). It was reported that 0.5 M HCl can effectively release $Pb^{2+}$ ion from blood samples.

(Nagler, R. M., Baum, B. J., and Fox, P. C.: Effect of X irradiation on the function of rat salivary glands at 3 and 40 days. *Rad. Res.*, 136: 392–396 (1993)). In our work saliva sample was diluted 5 times with acidic solution to a final concentration of 0.5 M HCl. The sample solution was then loaded in sample reservoir and was delivered by the integrated micro-pump. The sample solution flowed across a mercury (Hg)-film working electrode and exited through an outflow groove positioned directly across the Pt auxiliary electrode. Square wave anodic stripping voltametry (SWASV) was utilized for quantitation of Pb in the specimens. For Pb detection, a constant potential of −1.10 V was applied to the glassy carbon Hg-film electrode. When sample solution flowed over the electrode surface, $Pb^{2+}$ was reduced and accumulated. After a 3-min accumulation period, the potential of the Hg-film electrode was scanned from −1.10 V to −0.10 V. To eliminate the sample matrix effect for blood and saliva samples, after the accumulation period, a clean solution (0.5 M HCl) was pumped from another reservoir and replaced the sample matrix, then the stripping analysis was performed. After each measurement the Pb was stripped from the electrode surface and the sensor was then available for analysis of the next specimen.

Animal Studies

In order to validate the capability of the micro-analytical detection system to quantify Pb in biological specimens, rat studies were conducted using single acute oral doses of Pb-acetate. Adult male Fisher 344 rats were obtained from Charles River Laboratory and ranged from ~0.230 to 0.260 kg of body weight when used. Groups of rats (3–5 animals/dose) were administered an aqueous solution of Pb-acetate by oral gavage at doses of 0, 20, 50, 100, 200 and 500 mg/kg of body weight. At ~24 hr post-dosing the rats were anesthetized with an ip injection of ketamine (87 mg/kg) :xylazine (13 mg/kg). In addition, each rat was given an ip injection of the cholinergic agonist pilocarpine (1 mg/kg) to induce salivation. Saliva was then collected from each rat, using a glass capillary tube, for approximately 30-min (~1–2 mL saliva) at which time the rats were exsanguinated by cardiac puncture. Whole blood and saliva specimens were weighed and stored frozen (−80° C.) until the Pb analysis was conducted.

Analytical Methods

The concentration of Pb in the specimens was determined by inductively coupled plasma/mass spectrometry (ICP-MS). Whole blood and saliva were acid digested prior to ICP-MS analysis. To prepare the specimens for analysis they were carefully weighed into a tared AC (advanced composite) vessel and 1 mL each of deionized milli"Q" water and concentrated nitric acid, along with a known concentration of a bismuth (Bi-209) internal standard were added. The Teflon ACV vessels were capped and sealed into numbered stainless steel Parr Bomb sleeves, then transferred to a preheated oven and maintained at 140° C. for ~3-hr. Upon removing and cooling of the samples, each vessel was opened and rinsed with ~2.0 mL of a 7% nitric acid/water mix, the procedure was repeated 3-times. The contents of the vessel and rinses were transferred to a 14.0 mL coming centrifuge tube which was brought up to volume (14.0 mL) with 3.5% nitric acid. The Bi-290 internal standard (Hewlett Packard) and working Pb standard solutions were diluted to volume with 3.5% nitric acid and glassware was washed in a leaching solution (10% (v/v) $HCl/HNO_3$) to remove potential Pb contamination.

The Pb analysis was conducted with a Hewlett Packard (HP4500) ICP-MS. The analysis conditions were as follows.

The argon gas flow rates for plasma, auxiliary and carrier gases were 15.0, 1.0 and 1.3 L/min, respectively and the RF power was 1300W. The spray chamber (S/C) was double pass quartz with a S/C temperature of 2° C. A V-groove PEEK nebulizer was utilized with a sample uptake rate of 0.4 mL/min and a sample depth of 8 mm. The ICP-MS was set to acquire atomic mass units (AMU) for Pb-206, -207, -208 and Bi-209 (internal standard) with a dwell time of 1 sec/point and points/mass ratio of 3. The analysis time/mass was 3 sec and a total of 3 replicates/sample were run. The extraction efficiency for quality control samples ranged from 99–105% and the ICP-MS response was linear from 0.3–2000 ppb.

Pharmacokinetic Modeling

A PBPK model describing the disposition of Pb in the rat was modified to accommodate a saliva compartment. In general, the PBPK model structure and parameter estimations were as previously described, and the reader is referred to O'Flagherty for a detailed description of the model. (O'Flaherty, E. J.: Physiologically based models for bone-seeking elements. II. Kinetics of lead disposition in rats. *Toxicol. Appl. Pharmacol.*, 111: 313–331 (1991)). The additional model parameters used to describe the saliva compartment are presented in Table 1. Initial modeling efforts focused on modeling whole blood and saliva Pb concentrations. For simplification the model assumes a constant rate of saliva secretion based on the measured rate of salivation during pilocarpine treatment (0.048 L/day), recognizing that this represents an over estimation of normal saliva flow. The Pb that was secreted in the saliva was also available for fractional reabsorption from the gastrointestinal tract. The plasma: salivary glands partitioning coefficient for Pb and the volume of the salivary gland compartment were calculated from the data of Mobarak and P'an (P'an, A. Y. S.: Lead levels in saliva and in blood. *J. Toxicol. and Environ. Health*, 7: 273–280, (1981)) and Nagler et al, (Jagner, D., Josefson, M., Westerlund, S, and Aren, K.: Simultaneous determination of cadmium and lead in whole blood and in serum by computerized potentiometri stripping analysis. *Anal. Chem*, 53: 1406–1410 (1981)) respectively. The fraction of cardiac output to the saliva gland and $1^{st}$ order absorption rate for intraperitoneal (ip) Pb administration were determined by fitting the data of Mobarak and P'an. Only the $1^{st}$ order absorption rate constant for oral gavage administration and the fractional absorption from the gastrointestinal tract were optimized to the data obtained in the current experiments. All other model parameters were as previously described by O'Flaherty and/or the same as those used to fit the data from Mobarak and P'an.

Selected specimens of whole blood and saliva were analyzed by both ICP-MS and the micro-analytical detection system to evaluate the responsiveness of the micro-analytical system to quantitate Pb in biological matrixes over a range of concentrations. The results of this comparison are presented in Table 2 and a linear regression analysis was performed. For any given sample the concentration of Pb in the blood was significantly higher than the saliva Pb concentration, saliva Pb ranged from 8.5%–9% of the concentration in the blood. Overall, the micro-analytical system consistently under predicted both the blood and saliva concentration, averaging 85%±15% and 75%±14%, respectively of the results obtained with ICP-MS. However, a linear regression analysis comparing the ICP-MS vs. the micro-analytical system for both blood and saliva demonstrated a good correlation between the two methods with $r^2$ coefficients of 0.94 and 0.84, respectively. Although the micro-analytical device under estimated the Pb concentration in either blood or saliva, in the rat, the response is clearly linear over a broad range of Pb concentrations.

TABLE 2

Summary of Analytical Results of Saliva Samples

| Sample | Results of micro Analytical System (ppb) | Results of ICP/MS (ppb) |
|---|---|---|
| Rat Saliva Sample 1 | 108 | 150 |
| Rat Saliva Sample 2 | 111 | 116 |
| Rat Saliva Sample 3 | 80 | 99 |

To develop a PBPK model that incorporates a saliva compartment an understanding of the relationship between blood and saliva Pb concentration is needed. The data from the study by Mobarak and P'an was utilized to compare the concentration of Pb in the blood vs. saliva following repeated (3 dose) acute oral administration of Pb (100 mg/kg) in Sprague-Dawley rats. The results from this reanalysis suggest a reasonably good linear correlation ($r^2$=0.71) over the concentration range used in this particular study. Likewise, a comparison of the blood vs. saliva Pb concentrations from the current study in which Fischer 344 rats were orally administered Pb-acetate at doses ranging from 20–500 mg/kg of body weight was conducted. Although there was some variability in the data, at doses from 20 to 200 mg/kg a fairly reasonable linear correlation ($r^2$=0.63) was obtained. However, at blood Pb concentrations exceeding 0.7 mg/L (500 mg/kg dose group) the response appeared to be non-linear with the saliva Pb concentration significantly increasing relative to the blood. These results in the Fisher 344 rat are in contrast to the linear response the Mobarak and P'an reported at Pb concentrations approaching 2.5 mg/L in the Sprague-Dawley rat.

To develop the PBPK model and determine its predictive capability the model was initially fit to the single ip dose blood and saliva data of Mobarak and P'an, by optimizing the fractional blood flow to the saliva compartment and $1^{st}$ order absorption rate constant. All model parameters were then held constant and the capability of the model to predict blood and saliva Pb concentration following a second or third ip dose of Pb was evaluated. The capability of the PBPK model to predict blood and saliva Pb concentration in rats following 3 ip doses of Pb utilizing the data from Mobarak and P'an was analyzed. The model did a reasonably good job of fitting both the blood and saliva time-course data. The maximum log likelihood function for the model predicted vs. measured Pb concentration in blood and saliva were calculated and the percentage variation explained was 62% and 80%, respectively and 71% for the overall model prediction.

To test the predictive capability of the PBPK model, it was further evaluated against the data obtained in the current experiments. As previously noted, rats were administered a range of single acute oral doses and the blood and saliva Pb concentrations were determined at a single time point (24 hr post-dosing). The resulting comparison of the experimental data was compared against the model prediction. The model over predicted the saliva Pb concentration at the low dose (20 mg/kg) and slightly under predicted saliva Pb at the highest dose (500 mg/kg). Likewise, the model over predicted the blood Pb concentration following the 500 mg/kg body weight dose. The inability of the model to accurately predict the blood and saliva Pb concentrations for the high dose group (500 mg/kg) is consistent with the non-linear response observed at blood concentrations >0.7 mg/L. Overall, the model does provide a reasonably good fit to this limited experimental data set, for a range of single oral Pb doses (20–500 mg/kg).

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:

1. A compact, integrated electrochemical sensor system, comprising:
   a pump;
   a first layer comprising two inlets and an outlet;
   a second layer comprising a mixing channel comprising a mixing channel inlet and a mixing channel outlet and a via connecting the outlet of the mixing channel to an electrochemical cell; and
   two reservoirs connected to said two inlets;
   wherein one of the two reservoirs contains a sample and the sample comprises blood or saliva;
   wherein the mixing channel inlet is connected to the outlet of the first layer; and
   wherein the second layer and the electrochemical cell are connected without adhesive or clamps such that the electrochemical cell can be easily disconnected and reconnected.

2. A hand-held carrying case comprising the compact, integrated electrochemical sensor system of claim 1.

3. The compact, integrated electrochemical sensor system of claim 1 comprising two pumps wherein each of said pumps is a micropump and each of these micropumps has an inlet and an outlet and each micropump inlet is connected to an outlet of said first layer.

4. The compact, integrated electrochemical sensor system of claim 1 wherein one of said reservoirs contains a buffer or reagent solution.

5. The compact, integrated electrochemical sensor system of claim 4, wherein said system has a total external volume of between 70 and 300 cm$^3$.

6. The compact, integrated electrochemical sensor system of claim 1 wherein the sample contains blood or salvia and the other of said reservoir contains an acid solution.

7. The compact, integrated electrochemical sensor system of claim 1 wherein the first layer comprises a soft plastic material.

8. The compact, integrated electrochemical sensor system of claim 7 wherein plastic tubes connect the electrochemical cell to the first layer.

9. A method of electrochemically detecting metals in a compact, integrated electrochemical sensor system, comprising:
   passing a sample into the sensor system of claim 1.

10. The method of claim 9 comprising:
    placing sample in a reservoir;
    passing sample from the reservoir into a channel in a first layer;
    subsequent to the step of passing sample into a channel in the first layer, pumping sample out of the first layer and, subsequently,
    mixing the sample in the first layer with a second liquid;
    wherein the sample and the second liquid are mixed in a mixing channel to form a mixed solution; wherein the mixing channel is located within the first layer;
    passing the mixed solution into an electrochemical cell;
    measuring an electrical signal; and
    comparing the electrical signal with a standard signal to provide a measurement of metal concentration.

11. The method of claim 10 wherein said sample comprises blood or saliva;
    wherein said second liquid comprises a buffer or reagent solution; and
    wherein said method is selective for detecting lead.

12. The method of claim 10 wherein said sample comprises blood or saliva; wherein said second liquid comprises a buffer or reagent solution.

13. A compact, integrated electrochemical sensor system, comprising:
    a pump;
    a first layer comprising inlet to an analyte flow channel, an outlet from the analyte flow channel and a separate opening connected to a mixing channel inlet;
    a second layer comprising the analyte flow channel, a mixing channel comprising a mixing channel inlet and a mixing channel outlet and a via connecting an outlet of the mixing channel to an inlet of an electrochemical cell;
    wherein the mixing channel inlet is connected to the separate opening of the first layer;
    wherein the second layer does not have a continuous flow path connecting the analyte flow channel and the mixing channel.

14. The compact, integrated electrochemical sensor system of claim 13 wherein the flow channel and the mixing channel are microchannels.

15. The compact, integrated electrochemical sensor system of claim 13 wherein the electrochemical cell is in a third layer that is disposed on a side of the second layer that is opposite the side where the first channel is disposed; and
    comprising two flow channels, one of which is the analyte flow channel and one of which is a flow channel for a buffer or regent solution.

16. The compact, integrated electrochemical sensor system of claim 13 wherein the pump is disposed in a liquid flow path between the analyte flow channel and the mixing channel.

17. A method of electrochemically detecting metals in a compact, integrated electrochemical sensor system, comprising:
    passing an analyte in the sensor of claim 13.

18. A method of assembling a compact, integrated electrochemical sensor system, comprising:
    plugging an outlet of a mixing channel layer into an inlet of an electrochemical cell; and
    plugging a micropump into the mixing channel layer such that fluid can be pumped through the mixing channel layer and through the electrochemical cell;
    passing analyte in a first liquid in a reservoir from the reservoir into a channel in mixing channel layer;
    subsequent to the step of passing the analyte into the channel in the mixing channel layer, pumping analyte out of the mixing channel layer and, subsequently,
    mixing the analyte in the mixing channel layer with a second liquid.

19. The method of claim 18 wherein the mixing channel layer comprises a front plate comprising two inlets connected to channels in a middle plate;

wherein the front plate, middle plate and a bottom plate are laminated together;

wherein said channels in a middle plate are connected to a mixing channel that extends from the top to the bottom of the middle plate.

20. The method of claim 19 wherein the front plate is comprised of a soft plastic;

wherein said inlets are holes in the front plate and wherein plastic tubing is plugged into said holes.

21. The compact, integrated electrochemical sensor system of claim 18 wherein the micropump is plugged in such that an analyte can flow from a flow channel, through the micropump, and then flow into the mixing channel layer.

22. A kit for a portable, compact, integrated electrochemical sensor system, comprising:

a case that can be carried by an individual;

wherein said case comprises:
 a pump;
 a layer comprising a mixing channel; and
 an electrochemical cell;

wherein the pump, the layer comprising a mixing channel, and the electrochemical cell can be reversibly connected without the use of tools; and wherein the pump, the layer comprising a mixing channel, and the electrochemical cell are separate components.

23. The kit of claim 22 comprising reservoirs that can be reversibly connected onto the system without the use of tools.

24. A compact, integrated electrochemical sensor system, comprising:

a pump;

a first layer comprising an inlet and an outlet;

a second layer comprising a mixing channel comprising a mixing channel inlet and a mixing channel outlet and a via connecting the outlet of the mixing channel to an electrochemical cell;

wherein the mixing channel inlet is connected to the outlet of the first layer; and wherein the second layer and the electrochemical cell are connected without adhesive or clamps such that the electrochemical cell can be easily disconnected and reconnected; and wherein said system has a total external volume of between 70 and 300 $cm^3$.

25. A method of assembling a compact, integrated electrochemical sensor system, comprising:

plugging an outlet of a mixing channel layer into an inlet of an electrochemical cell;

plugging a micropump into the mixing layer such that fluid can be pumped through the mixing channel layer and through the electrochemical cell; and plugging a reservoir comprising a sample into an inlet of the mixing channel layer;

wherein the sample comprises blood or saliva.

* * * * *